April 15, 1941.  H. DREYFUSS  2,238,847
RAILWAY CAR
Filed Dec. 3, 1936   5 Sheets-Sheet 1
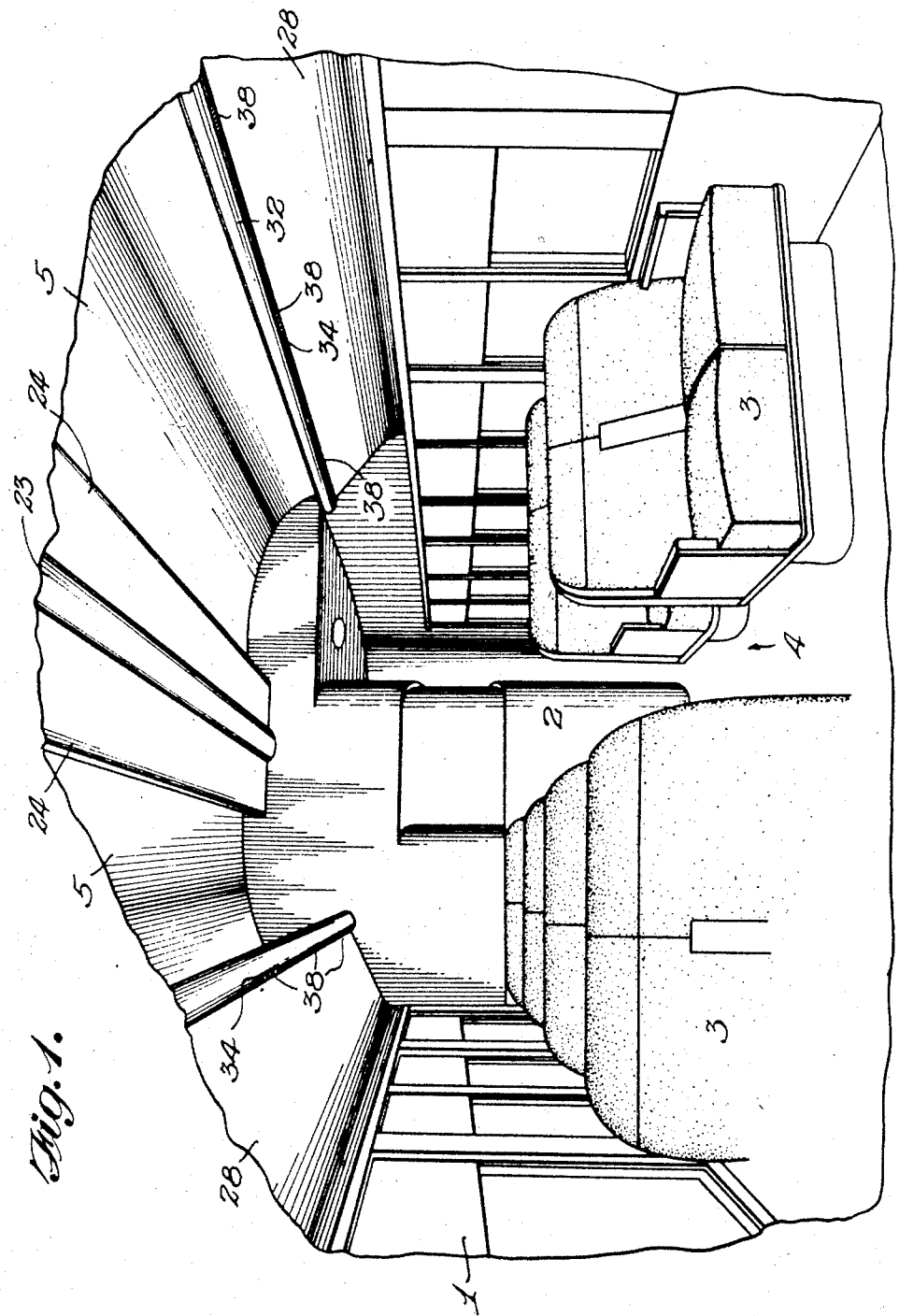

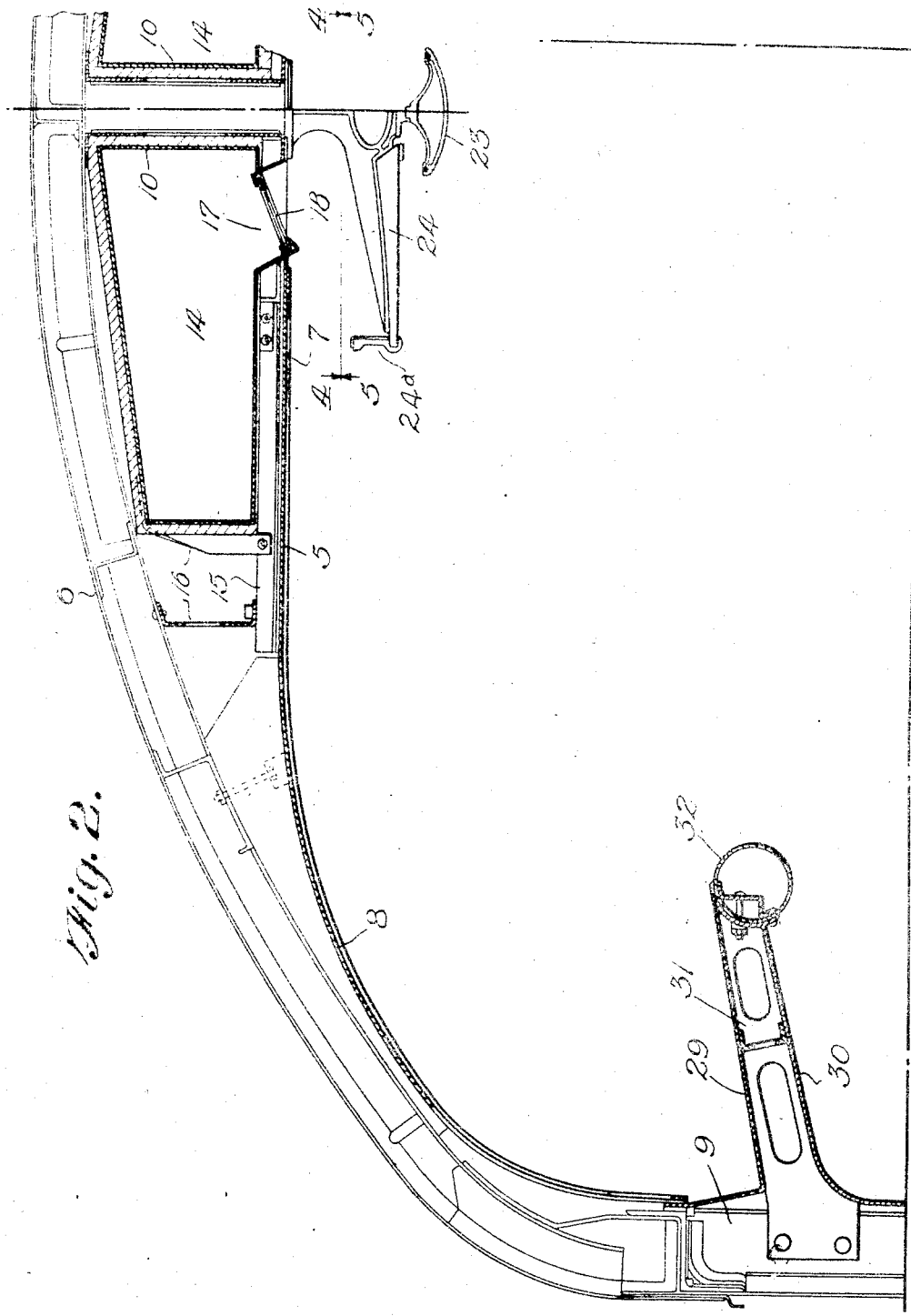

April 15, 1941. H. DREYFUSS 2,238,847
RAILWAY CAR
Filed Dec. 3, 1936 5 Sheets-Sheet 3
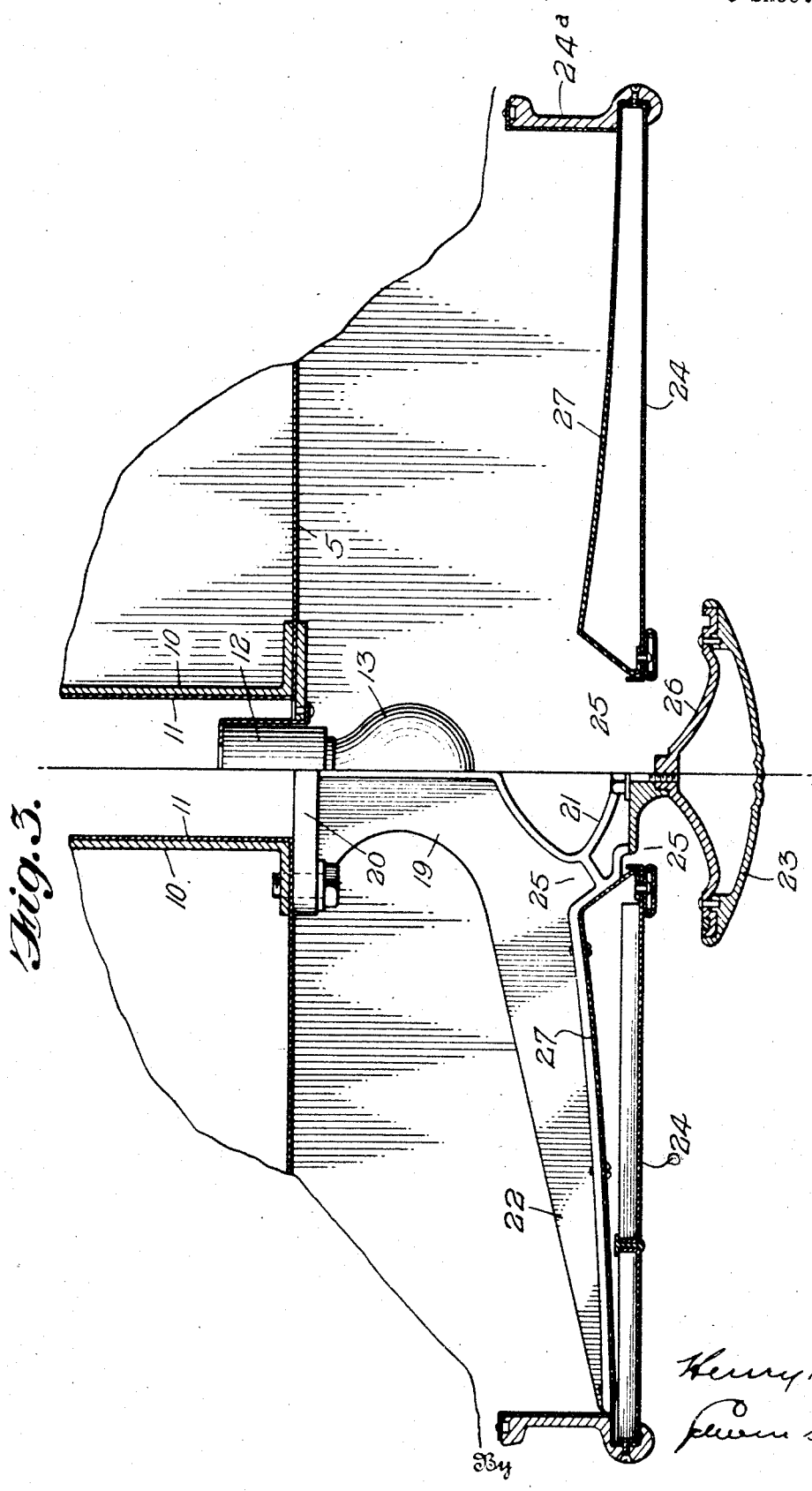

April 15, 1941. H. DREYFUSS 2,238,847
RAILWAY CAR
Filed Dec. 3, 1936 5 Sheets-Sheet 4
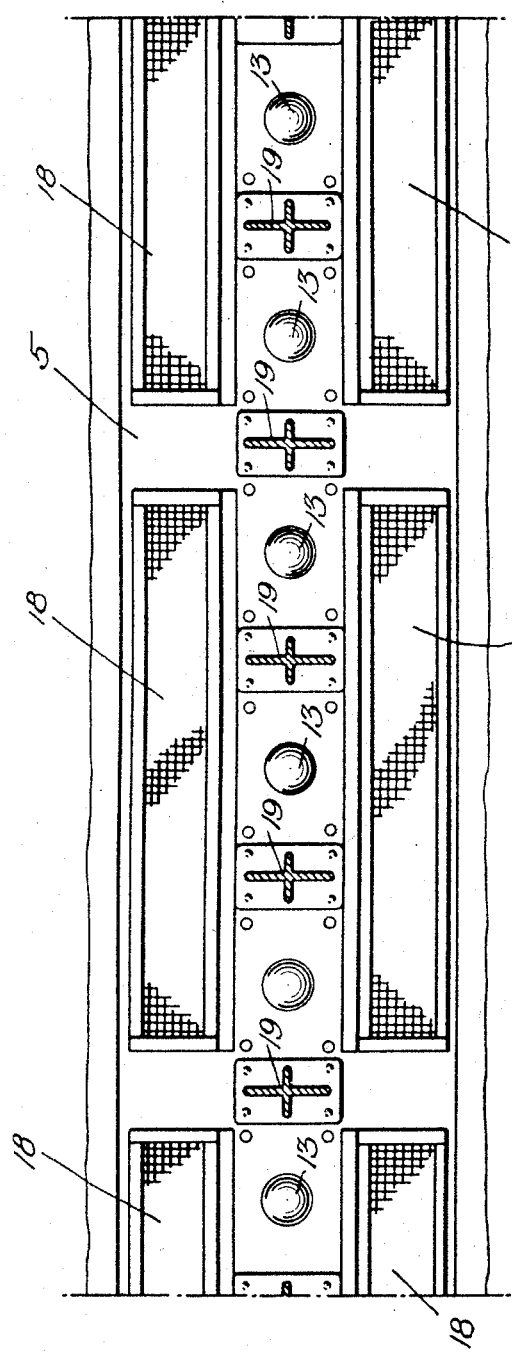
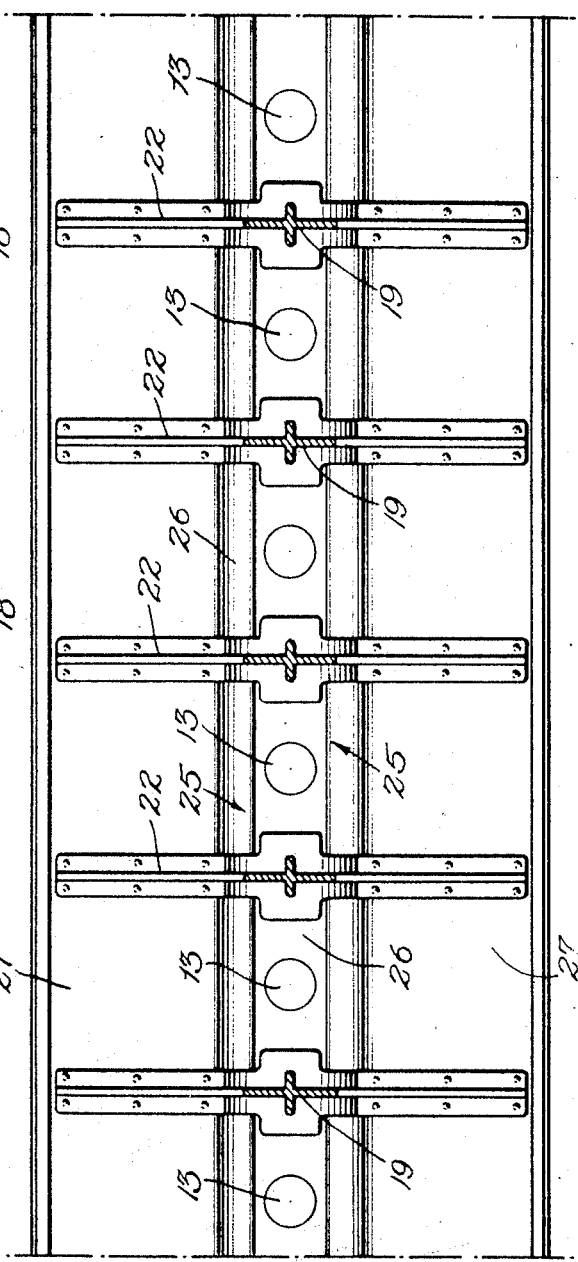
Inventor
Henry Dreyfuss
By [signature]
Attorney April 15, 1941.  H. DREYFUSS  2,238,847
RAILWAY CAR
Filed Dec. 3, 1936  5 Sheets-Sheet 5

Inventor
Henry Dreyfuss
By [signature]
Attorney

Patented Apr. 15, 1941

2,238,847

UNITED STATES PATENT OFFICE 2,238,847

RAILWAY CAR

Henry Dreyfuss, New York, N. Y., assignor to The New York Central Railroad Company, a corporation of New York Application December 3, 1936, Serial No. 114,075

4 Claims. (Cl. 240—7.35)

This invention relates to improvements in railway passenger cars, and particularly to novel means for illuminating the passenger compartment of a coach or other passenger car and novel means for supplying conditioned air to the passenger compartment of the car, the arrangement being such as to provide for general illumination of the passenger compartment as a whole as well as localized illumination of the passenger compartment above or in the immediate neighborhood of each passenger seat, so that effective illumination may be obtained by the use of a combination of indirect and direct lighting units. The arrangement is also such that the main lighting fixture arranged centrally and longitudinally of the ceiling of the car serves to conceal the center light lamps and centrally disposed air distributing means, and acts also as a baffle to properly direct the light rays and distribute or diffuse the air throughout the car and to prevent direct downdrafts.

One object of the invention is to provide a general illuminating means comprising a row of lights near the ceiling of the car which are concealed from view but from which the light rays are so directed as to indirectly illuminate the car throughout its seating area in a highly effective and pleasing manner.

Another object of the invention is to provide a baffle or shield arrangement for concealing the lights and conditioned air duct registers from view and directing both the rays of light and streams of air so as to secure general illumination without glare and general diffusion of the air without annoying or objectionable drafts.

Still another object of the invention is to provide combination general illuminating and air distributing means which is simple of construction and of attractive appearance.

Still another object of the invention is to provide concealed lighting means which may form part of the basket or luggage racks for illuminating the sides of the passenger compartment of the car above the seats so as to give the occupants of each seat adequate light for reading or other purposes, without glare or the direct shining of the lights into the eyes of the seat occupants.

With these and other objects in view, the invention consists of the features of construction, combination and arrangement of parts, hereinafter fully described and claimed, reference being had to the accompanying drawings, in which:

Fig. 1 is a perspective view of a portion of the interior of a railway passenger coach embodying my invention.

Fig. 2 is a vertical transverse section through the roof, ceiling and portion of the side of the car at one side of the center of the car, the section being on the line of one of the air duct registers.

Fig. 3 is a similar section on an enlarged scale through a part of the ceiling and the baffle or shield, taken at one side of the center of the car in the transverse plane of one of the supporting brackets and at the opposite side of the center of the car in the plane of one of the lamps.

Figs. 4 and 5 are sectional plan views on the horizontal plane of lines 4—4, 5—5 of Fig. 2, looking respectively upwardly and downwardly.

Figure 6:
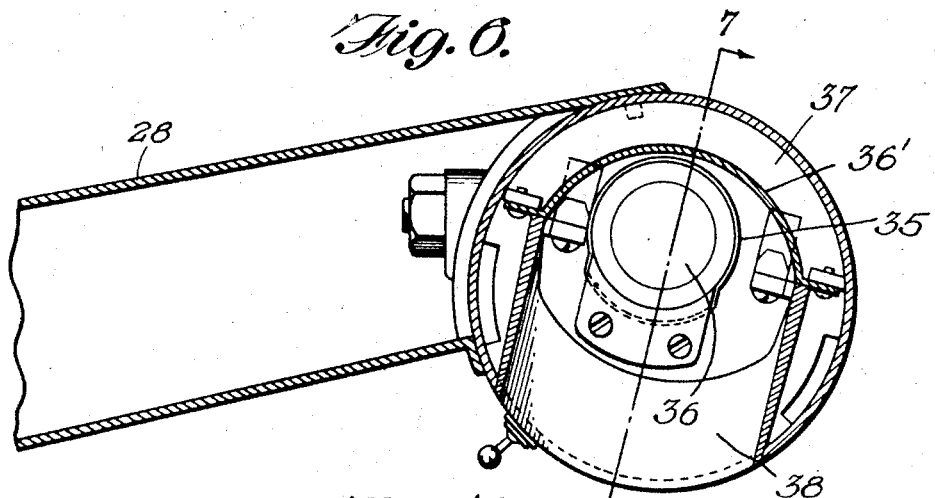
Fig. 6 is a transverse section through the rail of one of the basket or luggage racks, showing a light fixture therein.
Figure 7:
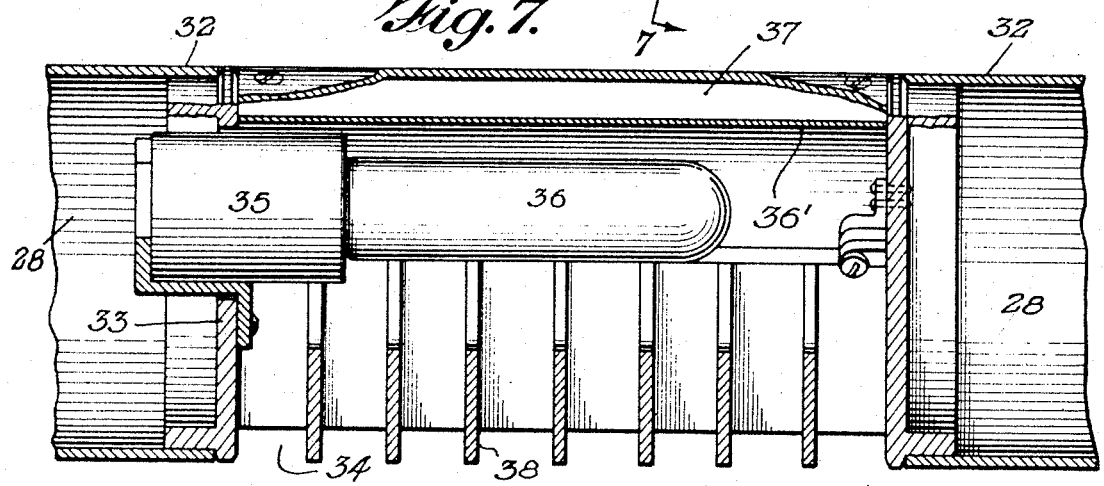
Fig. 7 is a longitudinal section on line 7—7 of Fig. 6.
Figure 8:
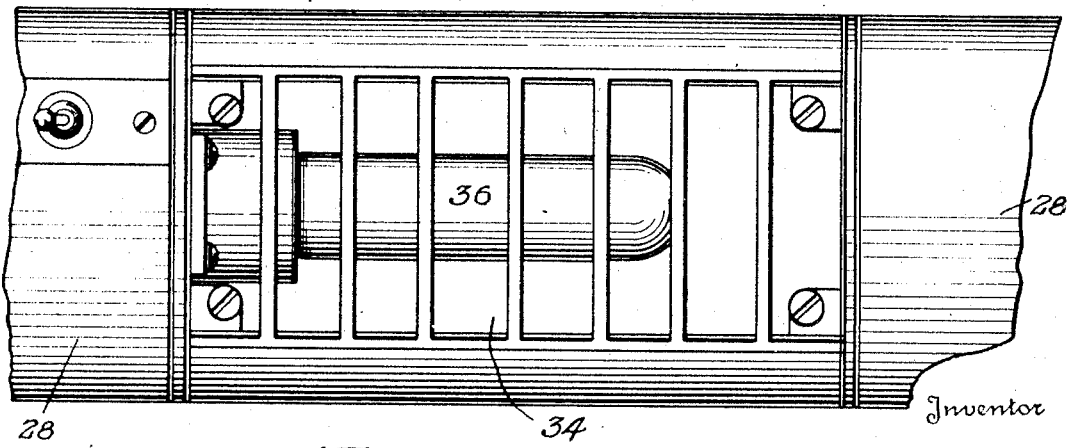
Fig. 8 is a bottom plan view of the parts shown in Figs. 6 and 7.

Referring now more particularly to the drawings, 1 designates a railway passenger car, shown herein as one of coach type, said car having a passenger compartment 2 provided with rows of seats 3 arranged on opposite sides of a center aisle or passageway 4.

The car has a ceiling 5 arranged below its roof 6, the central portion 7 of which ceiling is disposed in a substantially horizontal plane, while the side portions 8 thereof preferably extend from said central portion downwardly and outwardly toward the side walls 9 of the car on suitably curved lines. The central portion of the ceiling is supported from and held in spaced relation to the roof by a pair of spaced channel iron beams or supports 10 provided on their inner faces with linings 11 of insulating material.

Arranged within the space between the beams or supports 10, at regular intervals lengthwise of the passenger compartment, are sockets 12 for a row of incandescent or other electric lamps 13, the lamps of the row being spaced any suitable distance apart. These lamps are arranged in the lighting circuit of the car and are designed for generally illuminating the passenger compartment 2.

Disposed in the space between the ceiling portion 7 and the superposed portion of the roof 6 are air ducts 14 for supplying conditioned air to the passenger compartment from a suitable supply source. These ducts and the adjacent portions of the ceiling may be substantially supported from the beams 10 and roof by brackets 15 and braces 16. Each duct 14 is provided with rows of air discharge outlets 17, arranged above openings in the ceiling portion 5 adjacent to and on opposite sides of the longitudinal center of the ceiling. The outlets of each row are suitably spaced longitudinally of the car and are in number suitable for supplying conditioned air in proper volume to the passenger compartment. These outlets 17 are provided with registers 18, which may be of shutter or damper type so that the amount of air supplied to the passenger compartment may be regulated under required conditions.

Secured to the beams 10 at intervals along the length of the car are hanger brackets 19, each comprising an upper attaching portion 20, the bottom portion 21 and oppositely extending arms 22, which arms 22 extend in opposite directions transversely of the car underneath the ceiling portion 7 to points beyond the vertical plane of the outlet 17, and which are arranged in suitably spaced relation to the ceiling portions 7 and 8. To the central bottom portions of these brackets 21 is centrally secured an ornamental type of central shield member 23, and to the arms 22 of the brackets are secured side shield members 24, which shield members extend beneath the center of the ceiling from end to end of the passenger compartment 2. The shield member 23 is disposed below the inner longitudinal edges or margins of the shield members 24, and said inner longitudinal edges or margins of the shield members are disposed in spaced relationship to each other to provide light and air passages 25 for the downward passage of rays of light from the lamps 13 and streams of air from the outlet 17 against the upper surface of the central shield member 23. The upper surface 26 of the shield member 23 may be a light reflecting surface and suitably formed for directing the light rays in opposite directions outwardly beneath the shield members 24 and toward the sides of the car.

The lower surfaces of the shield members 24 and the lower portion of the shield member 23 may be suitably finished to conform to the finish of the interior of the coach. The upper surfaces 27 of the shield members 24 may be reflecting surfaces of suitable type and operate to direct the light rays and air currents falling thereon against the ceiling surfaces 7 and 8. The shield members 23 and 24 operate to conceal the illuminating lamps 13 and air discharge register 18 from view from below, and to prevent light rays from shining directly downward and into the eyes of passengers, and they also operate to prevent any downdrafts of air sufficient in velocity and volume to cause annoyance or discomfort to the passengers in the car. Said shield members 23 further serve the function of light and air distributing baffles, their arrangement being such that a limited amount of light and air is permitted to pass downward through the passages 25 to sufficiently illuminate the lower surfaces of shield member 24 and to sufficiently ventilate the center of the car, the remainder of the light rays and the greater proportion of the air being directed outwardly and upwardly by the surfaces 27 toward the opposite sides of the car, whereby such portions of the passenger compartments are generally illuminated and the air diffused uniformly throughout the area of the passenger compartment. In such light and air distributing actions the ceiling portions 5 and 8 may incidentally serve the function of reflecting and air guiding or conducting surfaces. Along the outer longitudinal edges of the shields 24 are preferably provided deflectors 24a projecting above the surfaces 27 to diffuse the laterally flowing air streams. By this means the entire area of the car will be generally illuminated in an effective manner by concealed or indirect lights which are entirely free from glare and give a general illumination of pleasing character, while at the same time the conditioned air is distributed in such manner as to uniformly ventilate the car without the production of drafts. The entire effect of the ceiling and shield construction, in addition to performing the functions above described, is to give a pleasing and attractive configuration and appearance to the ceiling of the car.

Mounted upon the side walls of the car beneath the ceiling and above the rows of seats 3 are basket or luggage racks 28 which may be of either open or closed type, but which are shown in the present instance as of closed type and comprising spaced upper and lower walls 29 and 30 secured at spaced intervals to supporting brackets 31 mounted on the side walls 9. Each of these racks is provided with an outer hollow or circular rim or rail portion 32, whereby it is stiffened at this point and given a desired finish or ornamental contour. This rail is utilized as a support for auxiliary light fixtures, the light fixtures in the rail of each luggage rack being preferably equal in number to and arranged above the individual seats 3 at the adjacent side of the car. Each of these light fixtures comprises a casing 33 arranged between divisions of the rail 32 and provided in its bottom with a light outlet or emission opening 34. One end of the casing 33 supports a socket 35 in which is fitted an electric lamp 36, which as herein shown is one of tubular type. The upper part of the casing 33 is preferably double-walled and provided with a dead air space 37 to reduce the amount of heat transmitted from the lamp to the outer wall. In the casing is a light reflector 36' which comprises or may be formed on the inner wall of said upper part of the casing. The outlets 34 of the lamp casings are so arranged as to direct the light rays downwardly and at an angle toward the seats 3, so as to localize direct illumination above and in the region of each seat suitable for reading and other purposes. A baffle device provided with rows of spaced baffle plates or louvres 38 projecting into the opening is provided for directing the light rays at the proper angle and concealing the lamp 36 from the view of passengers walking along the center aisle or occupying the seats, whereby the glare of light into the eyes of passengers is prevented. By this means provision is made for furnishing additional lights at the sides of the car localized with respect to the individual seats so as to increase the degree of illumination at each of these points, these rack lights also serving by the character of the illumination they cast to give with the general illuminating means at the ceiling center a direct lighting effect of highly pleasing character.

From the foregoing it will be seen that my invention provides means for generally illuminating a car in an indirect manner, and also particularly illuminating portions of the car in the region of passenger seats in a direct manner, whereby full and adequate illumination is furnished without casting glare and whereby the occupants of the seats may engage in reading or other occupations requiring use of the eyes without causing eye strain. It will also be seen that the invention provides a means whereby conditioned air may be supplied in an effective manner to the car to maintain the air in a wholesome state and at a comfortable temperature without causing drafts of any annoying or discomforting sort, the arrangement of the lighting and air supplying means cooperating to produce these desirable and very beneficial results.

While the structural organization shown for the purposes is preferred, it is to be understood that this is merely exemplificative, and that changes in the form, construction and arrangement of the parts may be made within the scope of the appended claims, without departing from the spirit or sacrificing any of the advantages of the invention.

What I claim is:

1. A passenger car having a passenger compartment, illuminating devices arranged at intervals along the center of the ceiling of the compartment, an air duct arranged above the ceiling and having outlets opening through the ceiling at spaced intervals along the center line of the ceiling, and a shielding means comprising a lower central shield arranged beneath the center of the ceiling and upper side shields having their inner edges in spaced relation and underlapped by the center shield and extending in opposite directions beneath and in spaced relation to the ceiling a portion of the distance between the center of the ceiling and sides of the car, the said shields operating to divide the light rays and air streams and direct the same toward the sides of the car.

2. A passenger car having a passenger compartment provided with illuminating means and air admission means along the center line of its ceiling, side shields extending outwardly from the center toward the sides of the compartment for directing the light from the illuminating means and air from the admission means toward said sides, a center shield arranged below the illuminating and air admission means for obscuring the illuminating means from direct view from below and deflecting the light rays and air currents toward said side shields, and air diffusers arranged along the outer longitudinal margins of the side shields.

3. A lighting fixture for application to the ceiling of a railway car or other vehicle beneath a row of bulbs, comprising three baffle strips, two of which are identical with each other in size and shape and are arranged symmetrically with respect to the longitudinal axis of the fixture in laterally separated relation to each other, with the gap between the same centered directly below the bulbs, and the third of which baffle strips is spaced below the first two baffle strips directly under the gap, with the outer edges of the third strip lapping the inner edges of the first two strips far enough to cut off any direct rays from the bulbs, and brackets positioned at intervals along the baffle strips for supporting all three of the same, said brackets being arranged between certain of the bulbs in vertical transverse planes and being secured to the tops of the first two strips and to the center only of the top of the third strip.

4. A bracket for an electric lighting system for vehicles, comprising a body portion, arms extending upwardly and laterally from said body portion, the outer ends of said arms being flattened, said arms having attaching brackets extending upwardly therefrom, and said body portion having projecting apertured feet for attaching an auxiliary reflector thereto.

HENRY DREYFUSS.